US012647702B2

(12) United States Patent
Castro et al.

(10) Patent No.: US 12,647,702 B2
(45) Date of Patent: Jun. 2, 2026

(54) FABRIC MODULES FOR SERVER TO SWITCH CONNECTIONS

(71) Applicant: Panduit Corp., Tinley Park, IL (US)

(72) Inventors: Jose M. Castro, Naperville, IL (US); Richard J. Pimpinella, Prairieville, LA (US); Bulent Kose, Burr Ridge, IL (US); Yu Huang, Orland Park, IL (US)

(73) Assignee: Panduit Corp., Tinley Park, IL (US)

( * ) Notice: Subject to any disclaimer, the term of this patent is extended or adjusted under 35 U.S.C. 154(b) by 669 days.

(21) Appl. No.: 17/989,245

(22) Filed: Nov. 17, 2022

(65) Prior Publication Data

US 2024/0171887 A1     May 23, 2024

(51) Int. Cl.
*H04Q 11/00*          (2006.01)
(52) U.S. Cl.
CPC . *H04Q 11/0005* (2013.01); *H04Q 2011/0052* (2013.01)
(58) Field of Classification Search
CPC ................... H04Q 11/0005; H04Q 2011/0052
See application file for complete search history.

(56) References Cited

U.S. PATENT DOCUMENTS

| | | | | |
|---|---|---|---|---|
| 8,621,111 | B2 * | 12/2013 | Marr ..................... | G06F 15/173 |
| | | | | 709/251 |
| 9,154,860 | B2 | 10/2015 | Hessong et al. | |
| 9,330,052 | B2 * | 5/2016 | Marr ....................... | H04L 49/45 |
| 10,477,288 | B2 * | 11/2019 | Wong ................. | H04Q 11/0062 |
| 10,742,513 | B2 * | 8/2020 | Wong ................. | H04L 41/0826 |

| | | | | |
|---|---|---|---|---|
| 11,070,437 | B2 * | 7/2021 | Wong ..................... | H04L 47/125 |
| 11,171,882 | B2 * | 11/2021 | Levy ................... | H04L 49/1515 |
| 11,269,152 | B2 * | 3/2022 | Bell ...................... | G02B 6/4453 |
| 11,509,538 | B2 * | 11/2022 | Wong ..................... | H04L 12/44 |
| 11,671,330 | B2 * | 6/2023 | Wong ................... | H04L 45/122 |
| | | | | 398/45 |

(Continued)

FOREIGN PATENT DOCUMENTS

| | | | | |
|---|---|---|---|---|
| WO | WO-2019099771 | A1 * | 5/2019 | |
| WO | WO-2021231233 | A1 * | 11/2021 | ........ G01M 11/3136 |

OTHER PUBLICATIONS

Singh, Sandeep, Core-Edge and Collapse-Core SAN Topologies, Cisco Community Technology and Support Data Center and Cloud Data Center and Cloud Knowledge Base; Aug. 2017, available at Core-Edge and Collapse-Core SAN Topologies—Cisco Community. (Year: 2017).*

(Continued)

*Primary Examiner* — Peter Radkowski
(74) *Attorney, Agent, or Firm* — Christopher K. Marlow; Christopher S. Clancy; James H. Williams

(57)          ABSTRACT
An apparatus having a plurality of multifiber connector interfaces, where some of these multifiber connector interfaces can connect to network equipment in a network using multifiber cables, has an internal mesh implemented in two tiers. The first is configured to rearrange and the second is configured to recombine individual fiber of the different fiber groups. The light path of each transmitter and receiver is matched in order to provide proper optical connections from transmitting to receiving fibers and complex arbitrary network topologies can be implemented with at least 1/N less point to point interconnections, where N=number of channels per multifiber connector interface.

9 Claims, 16 Drawing Sheets

(56)     References Cited

U.S. PATENT DOCUMENTS

| | | | | |
|---|---|---|---|---|
| 2012/0072602 A1* | 3/2012 | Marr | H04L 49/45 | |
| | | | | 709/228 |
| 2012/0250679 A1* | 10/2012 | Judge | H04L 49/15 | |
| | | | | 370/359 |
| 2014/0025843 A1* | 1/2014 | Marr | H04L 12/4625 | |
| | | | | 709/250 |
| 2015/0295655 A1* | 10/2015 | Hessong | H04J 14/0284 | |
| | | | | 398/58 |
| 2019/0245751 A1* | 8/2019 | Wong | H04L 45/122 | |
| 2019/0246187 A1* | 8/2019 | Wong | H04B 10/40 | |
| 2020/0336386 A1* | 10/2020 | Wong | H04L 12/4625 | |
| 2021/0080671 A1* | 3/2021 | Bell | G02B 6/4453 | |
| 2021/0288921 A1* | 9/2021 | Levy | H04L 49/1515 | |
| 2021/0320846 A1* | 10/2021 | Wong | H04L 41/0826 | |
| 2023/0052529 A1* | 2/2023 | Wong | H04L 49/1515 | |

OTHER PUBLICATIONS

Zhu et al., Fully programmable and scalable optical switching fabric for petabyte data center, Opt. Express 23, 3563-3580 (2015) (Year: 2015).*

* cited by examiner

16 Spline Switches

32 Edge (Leaf) Switches, (TOR, EOR,MOR)

16 Spine Switches

32 Leaf Switches

32 Edge Switches, (TOR, EOR,MOR)

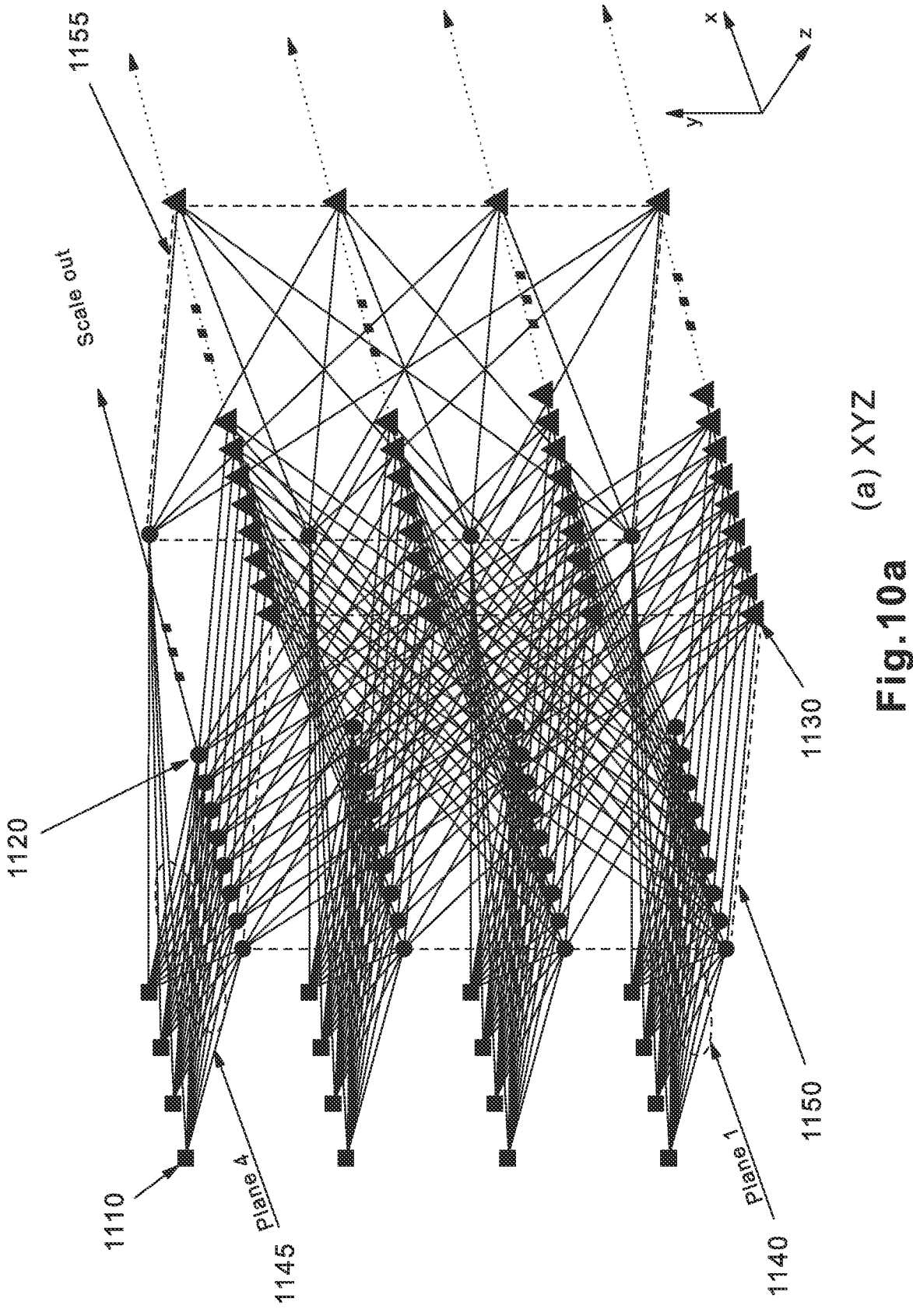
Fig.10a    (a) XYZ (b) XZ (c) YZ

FABRIC MODULES FOR SERVER TO SWITCH CONNECTIONS

FIELD OF INVENTION

Disclosed is an apparatus and method to improve the scalability of Data Center networks using mesh network topologies, switches of various radixes, tiers, and oversubscription ratios. The disclosed apparatus and method reduces the number of manual network connections, simplifying the cabling installation, improving the flexibility and reliability of the data center at a reduced cost.

BACKGROUND

The use of optical fiber for transmitting communication signals has been rapidly growing in importance due to its high bandwidth, low attenuation, and other distinct advantages, including radiation immunity, small size, and lightweight. Datacenter architectures using optical fiber are evolving to meet the global traffic demands and the increasing number of users and applications. The rise of cloud data centers, particularly the hyperscale cloud, has significantly changed the enterprise information technology (IT) business structure, network systems, and topologies. Moreover, cloud data center requirements are impacting technology roadmaps and standardization.

The wide adoption of server virtualization and advancements in data processing and storage technologies have produced the growth of East-West traffic within the data center. Traditional three-tier switch architectures comprising Core, Aggregation, and Access (CAA) layers cannot provide the low and equalized latency channels required for East-West traffic. Moreover, since the CAA architecture utilizes spanning tree protocol to disable redundant paths and build a loop-free topology, it underutilizes the network capacity.

The Folded Clos network (FCN) or Spine-and-Leaf architecture is a better-suited topology to overcome the limitation of the three-tier CAA networks. A Clos network is a multilevel circuit switching network introduced by Charles Clos in 1953. Initially, this network was devised to increase the capacity of crossbar switches. It became less relevant due to the development and adoption of Very Large Scale Integration (VLSI) techniques. The use of complex optical interconnect topologies initially for high-performance computing (HPC) and later for cloud data centers makes this architecture relevant again. The Folded-Clos network topology utilizes two types of switch nodes, Spine, and Leaf. Each Spine is connected to each Leaf. The network can scale horizontally to enable communication between a large number of servers while minimizing the latency and non-uniformity by simply adding more Spine and Leaf switches.

FCN depends on k, the switch radix, i.e., the ratio of Leaf switch server downlink compared to Spine switch uplink, and m, the number of tiers or layers of the network. The selection of (k,m) has a significant impact on the number of switches, the reliability and latency of the network, and the cost of deployment of the data center network. FIG. 1 shows the relationship between the number of servers for different levels of oversubscription, assuming all switches have similar radix and total oversubscription 1:1.

FIG. 2 shows an example of two FCNs with a similar number of hosts, using different radixes and levels. The higher radix, 32 in this example, connects 32 edge switches in a two-layer network, as shown in part (a) of the figure. The two-level FCN provides the lowest latency at the cost of requiring a denser network (512 interconnections). By using a three-layer network, the interconnection layout simplifies (256 interconnections). However, more switches are needed, and more latency is introduced in the network. During the last years, the need for flatter networks to address the growing traffic among machines has favored the radix increase of the switches' application-specific integrated circuits (ASICs). Currently, switch ASIC radixes can handle 256 ports at a speed of 100 Gb/s per port. ASICs with higher radixes are expected in the future.

Based on industry telecommunications infrastructure Standard TIA-942-A, the locations of leaf and spine switches can be separated by tens or hundreds of meters. Typically, Spine switches are located in the main distribution area (MDA), whereas Leaf switches are located in the equipment distribution area (EDA) or horizontal distribution area (HDA).

This architecture has been proven to deliver high-bandwidth and low latency (only two hops to reach the destination), providing low oversubscription connectivity. However, for large numbers of switches, the Spine-Leaf architecture requires a complex mesh with large numbers of fibers and connectors, which increases the cost and complexity of the installation.

Future data centers will require more flexible and adaptable networks than the traditional mesh currently implemented to accommodate highly distributed computing, machine learning (ML) training loads, high levels of virtualization, and data replication.

Traditionally the mesh fabrics such as the ones shown in FIG. 2 have been implemented between switches. For example, from Super-Spines to Spines, from Spines to Leaf, and from Leaf to edge switches. However, new high radix ASICs and the availability of servers with high-speed optical ports, e.g., servers that support four or more SFP-56 or SFP-112 transceivers, can produce changes in the fabric topology. To start, for many networks, it can be advantageous to move the mesh fabric close to the servers, replacing the TOR or MOR, or EOR with passive structured cabling optical connectivity.

A Spline network is a terminology used by some vendors to describe a network where servers connect to two or more switches. In essence it can be considered as a Leaf-Spine network without any Leafs, or in a wide sense, Spines become Leafs. The Spline encompasses a more genera topology to bring the fabric mesh to servers, network interface cards (NICS), tensor processor units (TPUs) or graphic processor units (GPUs).

The deployment of fabric to the servers and the scaling out of this type of network with several hundred or thousands of servers is not an easy task. A large number of interconnections from servers to Leaf and Leaf to Spine is needed.

The interconnecting fabric to the server can be prone to errors which can be accentuated in many cases by challenging deployment deadlines or the lack of training of installers. Although the Spine-Leaf topology is resilient to misplaced connections, a large number of interconnection errors will produce a noticeable impact due to performance degradation resulting in the loss of some server links. Managing large-scale network configurations usually requires a dedicated crew to check the interconnections, which causes delays and increases the cost of the deployment.

Using transpose boxes, as shown in the prior art, can help to reduce installation errors. However, the prior art cannot be easily adapted to different network topologies, switches radixes, or oversubscription levels. Moreover, the prior art was designed to interconnect switches and not servers.

A new mesh method and apparatus that utilizes modular flexible, and better-organized interconnection mapping that can be quickly and reliably deployed, bringing the mesh to the server, is disclosed here.

In U.S. Pat. No. 8,621,111, US 2012/0250679 A1, and US 2014/0025843 A1, a method of providing scalability in a data transmission network using a transpose box was disclosed. This box can connect the first tier and second tier of a network. This box facilitates the deployment of the network. However, a dedicated box for a selected network is required. As described in that application, the network topology dictates the type of transpose box to be used. Changes in the topology can require swapping the transpose boxes. Based on the description, a different box will be needed if the number of Spine or Leaf switches changes, the oversubscription, or other parameters of the network change.

Once the topology is selected, the application provides a method for scaling. This requires connecting the port of one box to another with a cable. This adds losses to the network and cannot efficiently accommodate the scaling of the network.

This approach disclosed in US 2014/0025843 A1, can work well for a large data center that has already selected the type of network architecture to be implemented and can prepare and maintain stock of different kinds of transpose boxes for its needs. A more flexible or modular approach is needed for a broader deployment of mesh networks in data centers.

In W2019099771A1, an interconnection box is disclosed. This application shows exemplary wiring to connect individual Spine and Leaf switches using a rack-mountable 1RU module. The ports of these modules are connected internally using internal multi-fiber cables that have a specific mesh incorporated. However, the module appears to be tuned to a particular topology, such as providing mesh among four spine and leaf switch ports. The application does not describe how the device can be used for topologies with a variable number of leaf or spine switches or with a variable number of ports.

In US20150295655A, an optical interconnection assembly that uses a plurality of leaf-side multiplexers and demultiplexers at each side of the network, one on the Spine side and another set near the Leaf is described. Each mux and demux is configured to work together in the desired topology. However, the application does not demonstrate the flexibility and scalability of this approach.

U.S. Ser. No. 11/269,152 describes a method to circumvent the limitations of optical shuffle boxes, which according to the application, do not easily accommodate for reconfiguration or expansion of switch networks. The application describes apparatuses and methods for patching the network links using multiple distribution frames. At least two chassis are needed to connect switches from one to another layer of a network. Each chassis can accommodate a multiplicity of modules, e.g., cassettes arranged in a vertical configuration. The connection from a first-tier switch to one side of the modules is made using breakout cables. One side of the breakout cables is terminated in MPO (24 fibers) and the other in LC or other duplex connectors. One side of the modules has one or two MPO ports, and the other six duplex LC connectors or newer very-small form factor (VSFF) connectors.

Similarly, the second-tier switch is connected to modules in the other chassis. The patching needed to connect the switches is performed using a plurality of jumper assemblies configured to connect to the plurality of optical modules. The jumpers are specially designed to fix their relative positions since they must maintain the correct (linear) order. U.S. Ser. No. 11/269,152 describes a method for patching, and it can make networks more scalable depending on the network radix. However, the network deployment is still challenging and susceptible to interconnection errors.

SUMMARY

An apparatus having a plurality of multifiber connector interfaces, where some of these multifiber connector interfaces can connect to network equipment in a network using multifiber cables, has an internal mesh implemented in two tiers. The first is configured to rearrange and the second is configured to recombine individual fiber of the different fiber groups. The light path of each transmitter and receiver is matched in order to provide proper optical connections from transmitting to receiving fibers and complex arbitrary network topologies can be implemented with at least 1/N less point to point interconnections, where N=number of channels per multifiber connector interface.

BRIEF DESCRIPTION OF THE DRAWINGS

FIG. 10(a) shows 3D view of the fabric.

DESCRIPTION OF INVENTION

The current trend of having switches with 256 or larger radixes, servers with a connectivity capacity of hundreds of Gbps, servers with hundreds of Gbps connection capacity, and high-speed optical transceivers operating in breakout mode can provide significant changes and advantages for data center networks.

This trend will enable replacing the last layer of switches in a FCN, such as TOR, MOR, or EOR, with a passive optical access layer. This involves a change in the network topology that will move the mesh fabric to the servers. The immediate benefit of this new topology is the reduction of latency, power consumption, and in general, the throughput of the network.

Transceiver operation in breakout mode has been available since the deployment of 40GBASE-SR. Currently, breakout ratios are 1-to-4 or 1-to8 are deployed in data centers. For example, 400GBASE-SR8 (multimode) or 200/400GBASE-DR4 (single mode) transceivers. Among both breakout ratios, the 1-to-4, using transceivers with eight or 12-fiber MPOs as media-dependent-interfaces (MDI), have been predominant. This is likely to change when future 800GBASE-SR-8 and 800GBASE-DR8 transceivers are released.

A set of modular apparatuses and a general method to bring the mesh fabric to the server for a diversity of fabric configurations is disclosed in this document. The modules 400 and 600 and connection methods can be used with standalone, stacked, or chassis network switches, depending on the fabric implementation. In particular, switches with Ethernet specified SR4, SR8 or DR4 transceivers in their ports and servers using optical transceivers with duplex ports, SR, DR, e.g., LC, SN, or MDC connectors.

Figure 1:
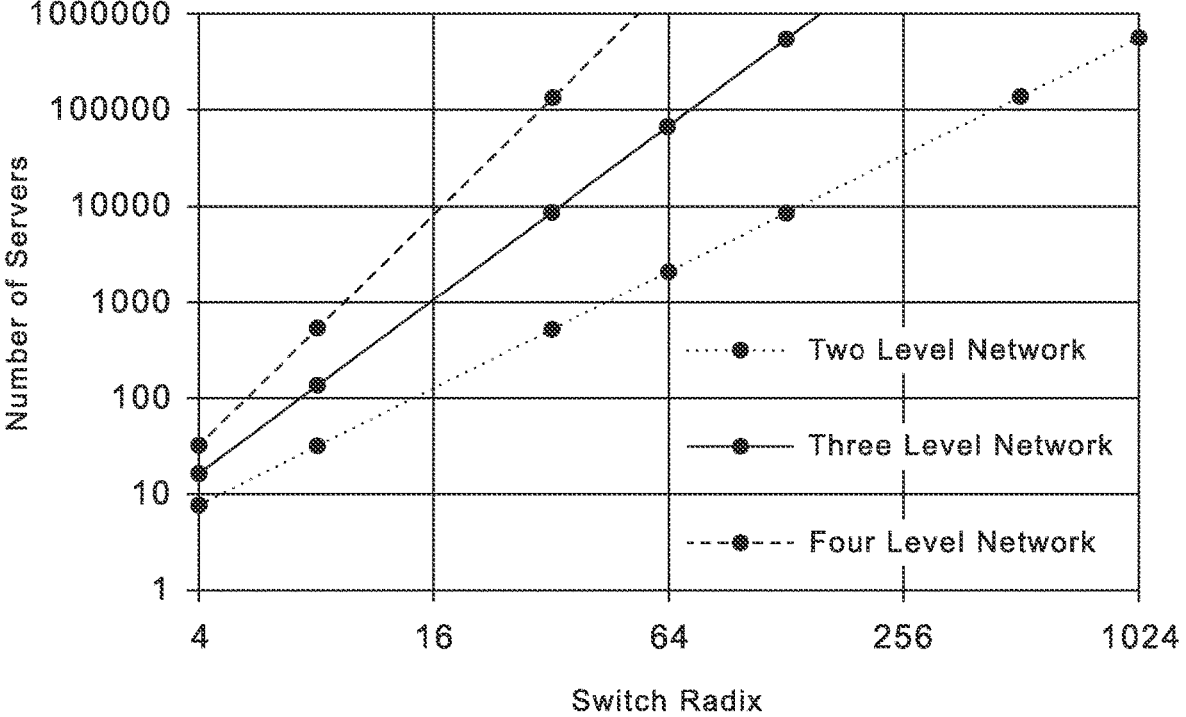
FIG. 1 shows the number of servers as a function of switch radix and the number of switch layers of the network.
Figure 2A:
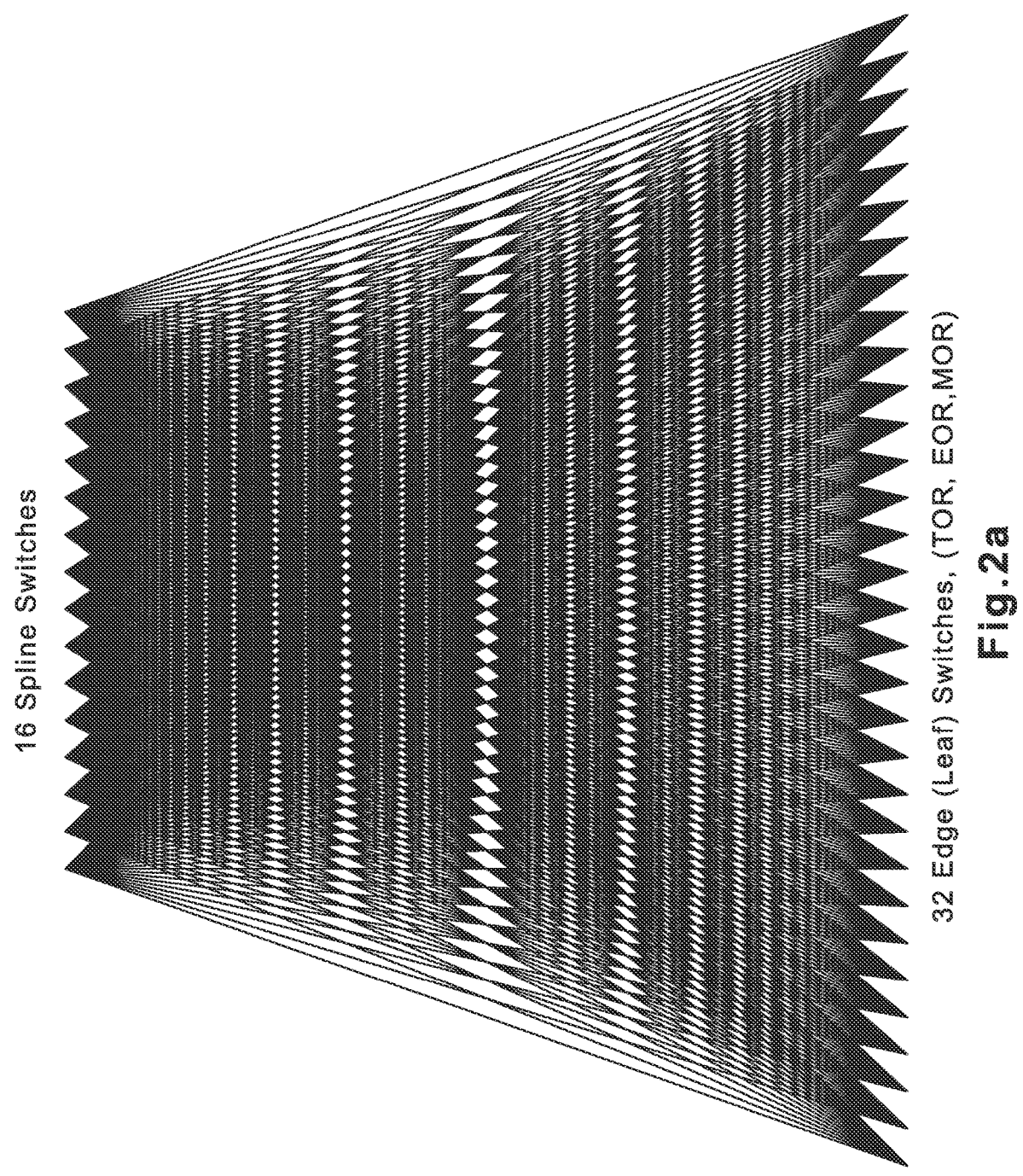
FIG. 2(a) shows a two-level FCN radix 32.
Figure 2B:
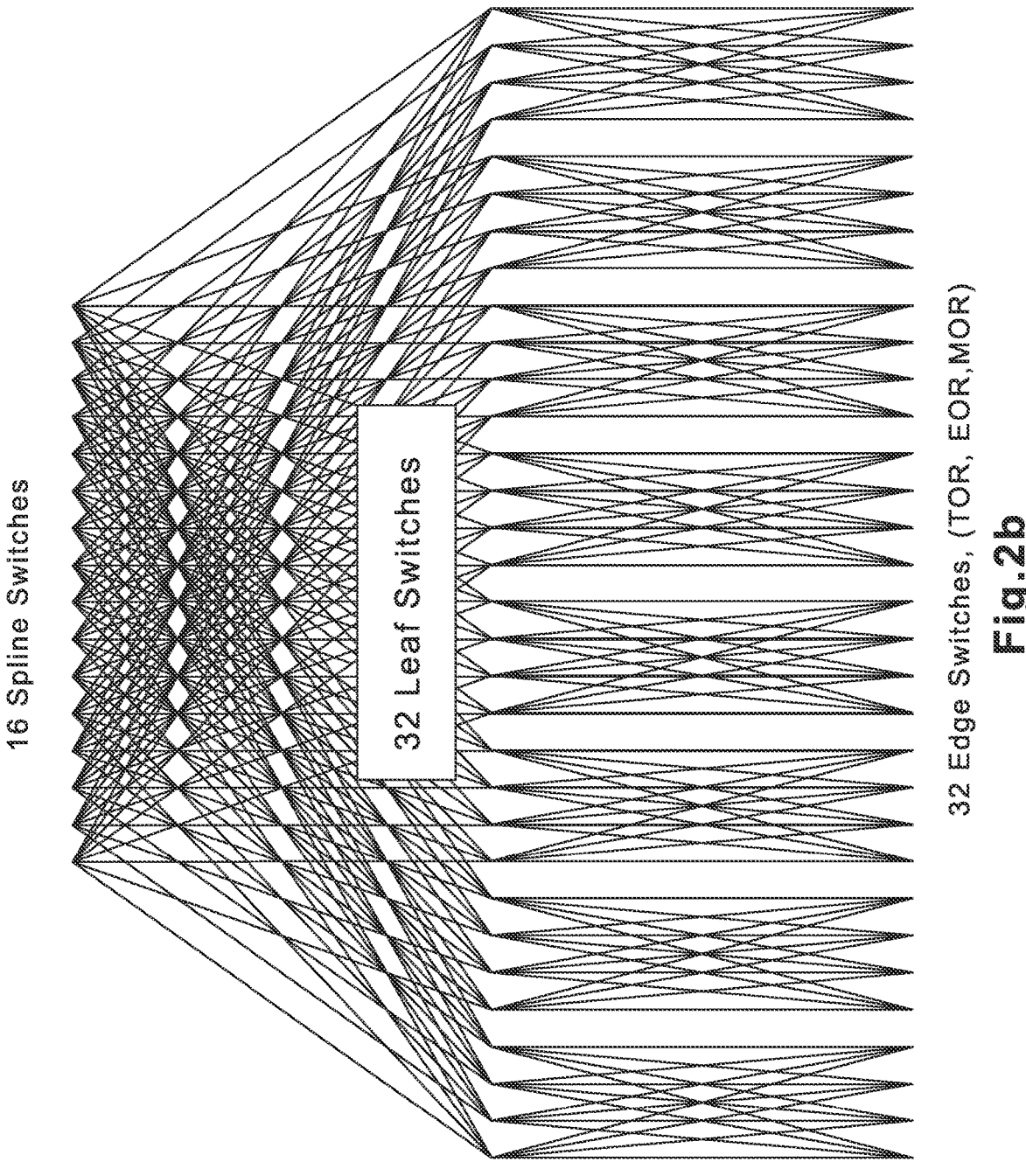
FIG. 2(b) shows a three-level FCN radix 8.
Figures 3A, 3B:
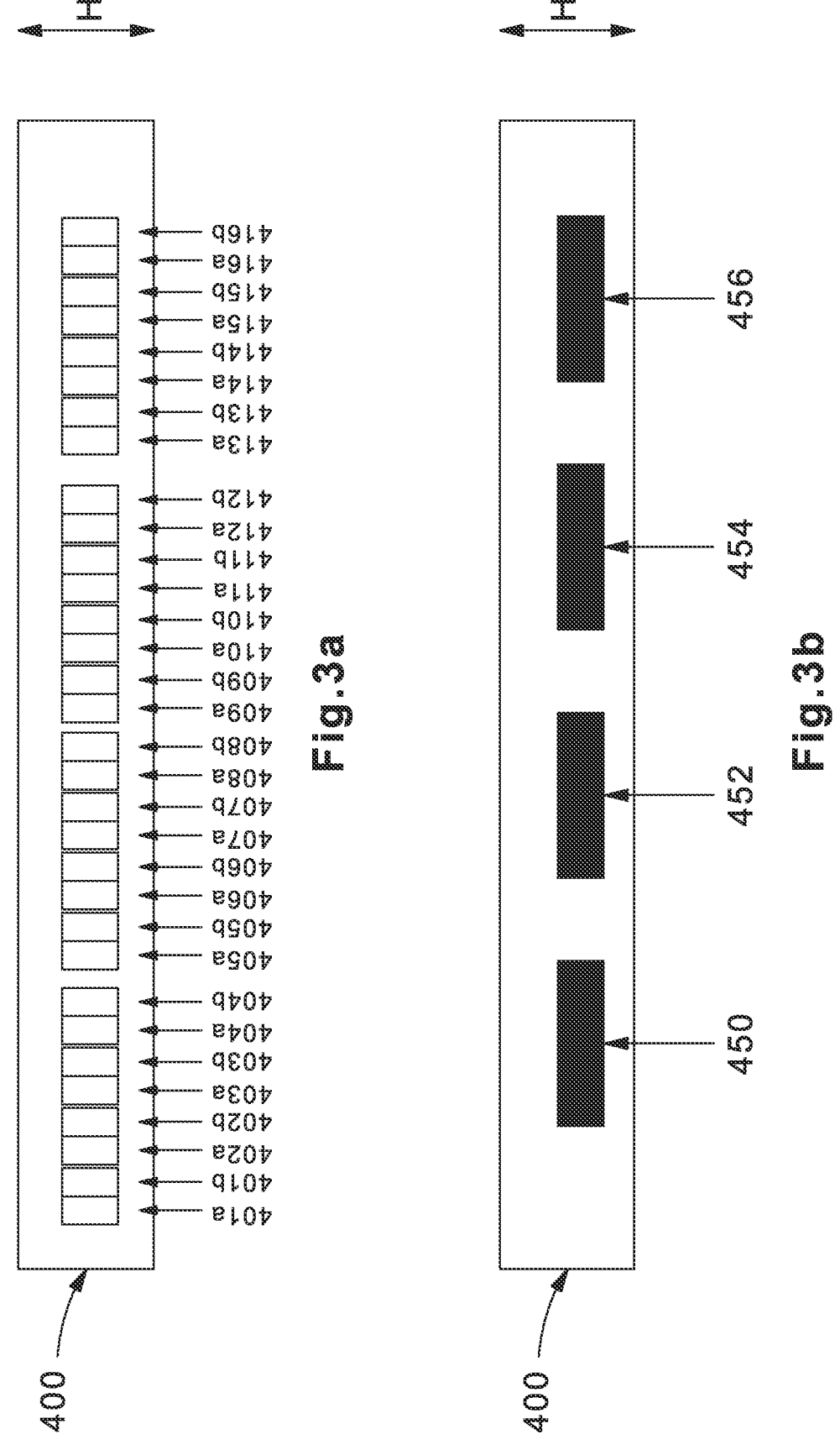
FIG. 3(a) shows a front view of Module 400.
FIG. 3(b) shows a rear view of Module 400.

FIG. 3 shows a front and rear view of module 400, which requires transceivers SR4 or DR4 in the switches.

Each module 400 can be used to combine duplex fibers from up to 16 server ports. A stack of modules 400 is essential to facilitate mesh fabric deployment at the server level. Module 400 has 16 duplex connectors and four parallel connectors. The duplex ports (410 to 416) in the front side of module 400 can be implemented using LC, SC, SN, MDC, or other duplex connectors. The parallel ports (450,452,454, and 456) can be implemented using sets of four duplex connectors, e.g., four MDC or parallel connectors such as MPO or MMC, each comprising four duplex channels. The duplex and parallel set of connectors can be placed on opposite sides, as shown in the figure or in the same side of the module (not shown).

Ports 410 to 416 connect to servers in the equipment distribution area (EDA), whereas ports 450,452,454, and 456, assumed MPO connectors for illustration purposes, connect to optical cables from switches located in the horizontal distribution area (HDA) or main distribution area (MDA).

Figure 4:
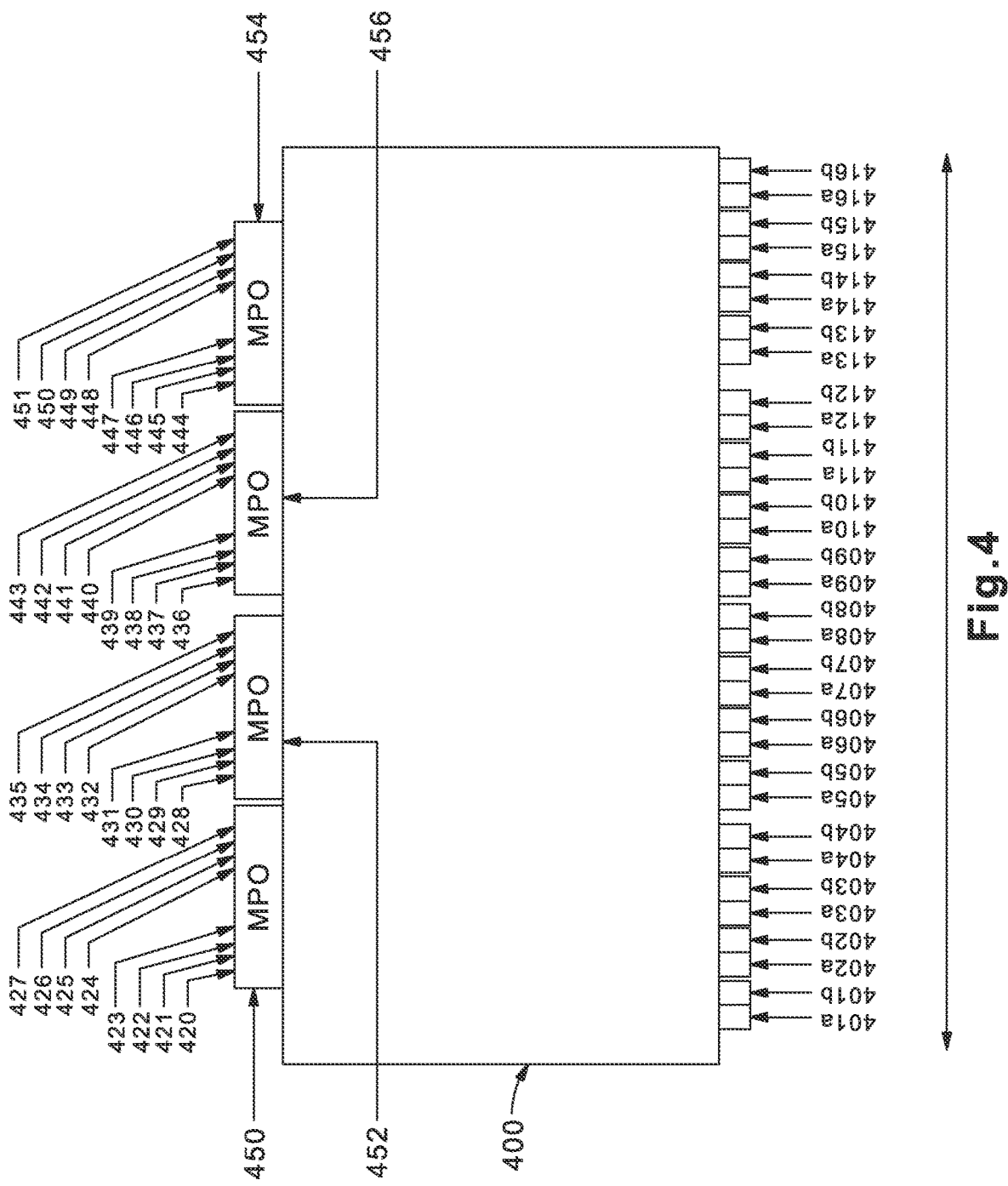
FIG. 4 shows a top view of Module 400.

FIG. 4 shows a top view of module 400, showing the duplex connections, 401-416, where labels a and b are used to differentiate between a transmitting or receiving port. The figure also indicates the MPO connections 450,452,454, and 456 on the opposite side of the duplex connections. The labels 420 to 454 represent the fibers inside the MPO connectors 450,452,454, and 456. Note SR4 or DR4 transceivers only use 8 fibers of a MPO connector. The width of module width, W, can be in the range of 12 inches up to 19 inches, and the height, H, is in the range of 0.4 to 0.64 inches.

Figure 5:
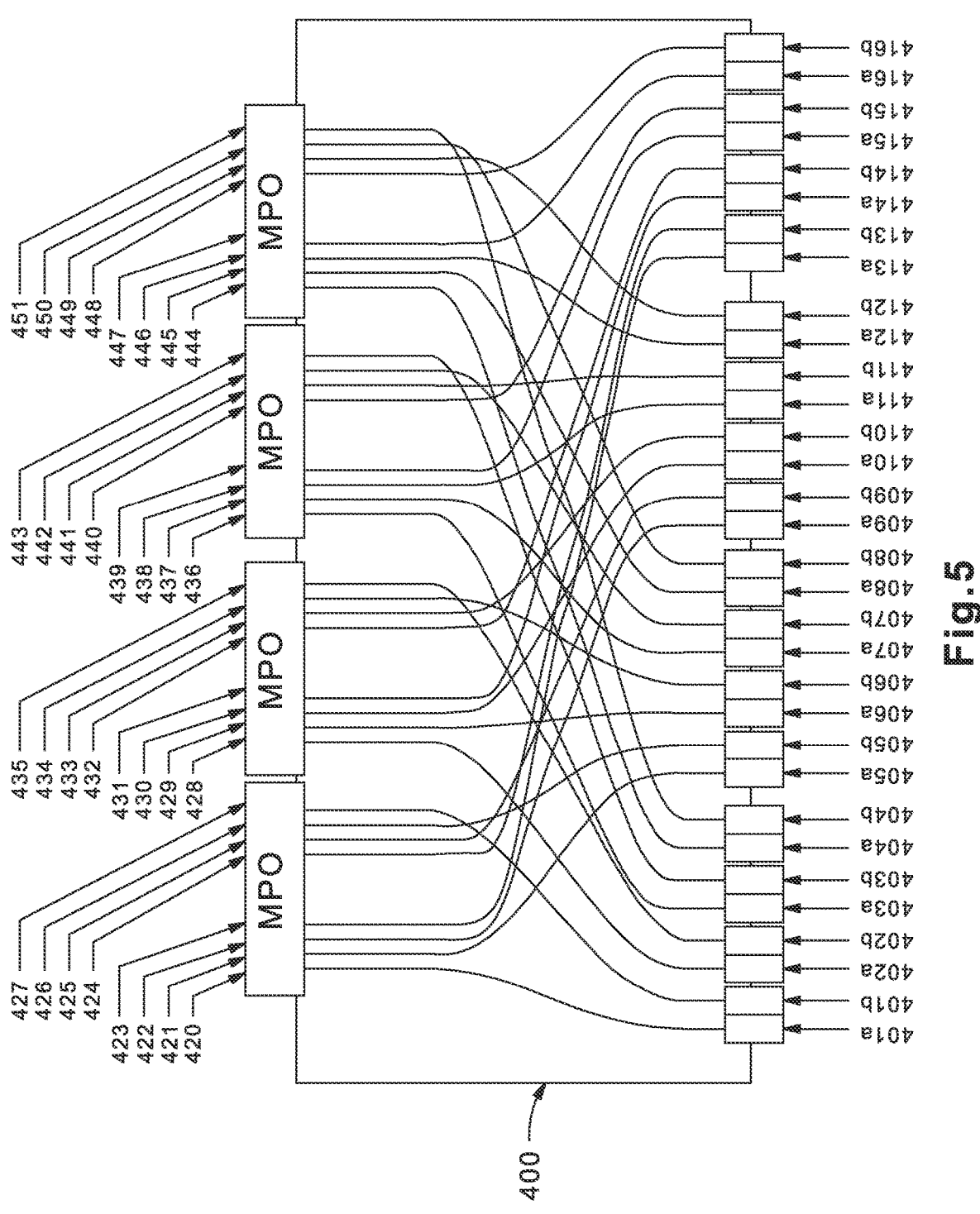
FIG. 5 shows a top view of Module 400 showing interconnection arrangements.

FIG. 5 shows the interconnection scheme of the modules according to the present invention. The resultant interconnection map of module 400, comprising the fiber mesh, is shown in Table I. The arrows in the Table represent the light direction from transmitter to receivers. This direction is just referential since it can change depending on the interconnection scheme used to connect from the module to servers or switches. More information on interconnection schemes external to module 400, can be obtained from TIA 568 documents.

TABLE I

| Interconnection table of module 400 |
| --- |
| 401a –> 420 |
| 401b <– 427 |
| 402a –> 428 |
| 402b <– 435 |
| 403a –> 436 |
| 403b <– 443 |
| 404a –> 444 |
| 404b <– 451 |
| 405a –> 421 |
| 405b <– 426 |
| 406a –> 429 |
| 406b <– 434 |
| 407a –> 437 |
| 407b <– 442 |
| 408a –> 445 |
| 408b <– 450 |
| 409a –> 422 |
| 409b <– 425 |
| 410a –> 428 |
| 410b <– 435 |
| 411a –> 436 |
| 411b <– 443 |
| 412a –> 444 |
| 412b <– 451 |
| 413a –> 423 |
| 413b <– 424 |
| 414a –> 431 |
| 414b <– 432 |
| 415a –> 439 |
| 415b <– 440 |
| 416a –> 447 |
| 416b <– 448 |

Figure 6A:
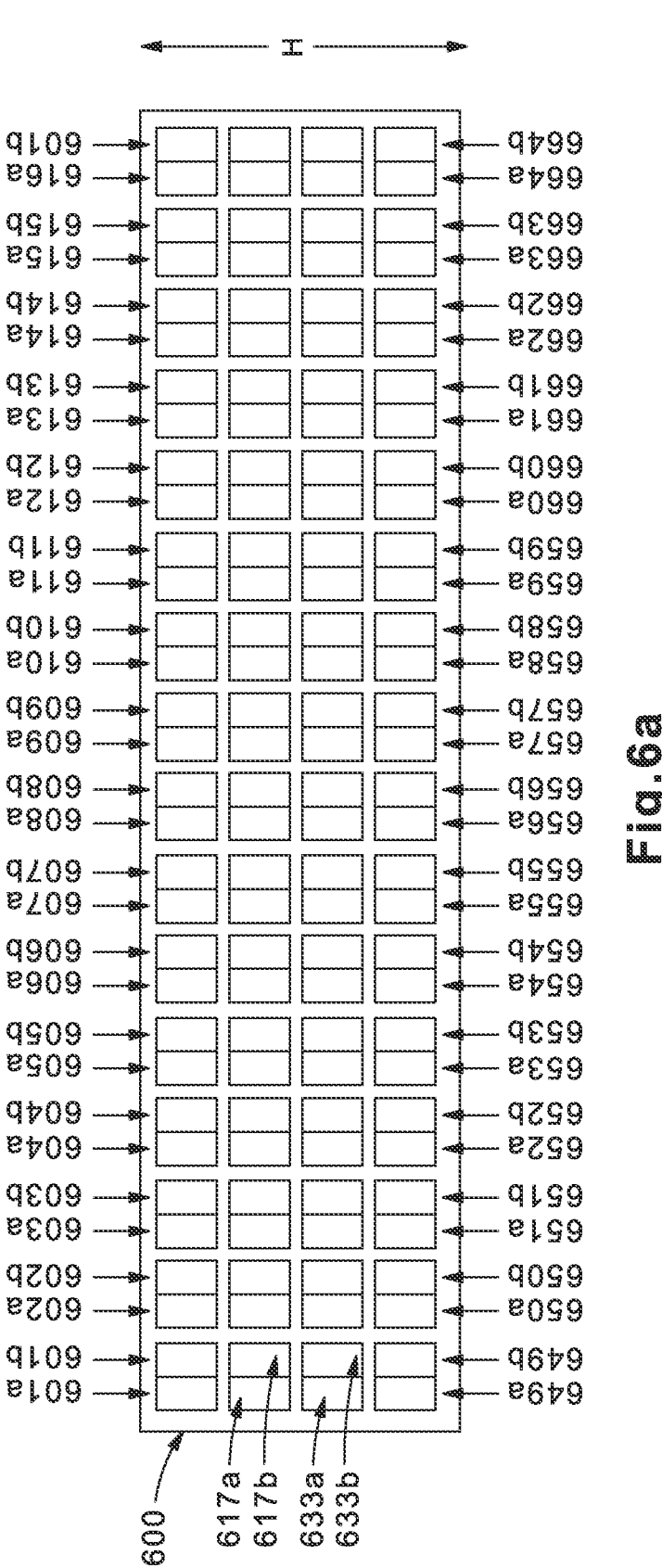
FIG. 6(a) shows a front view of Module 600.
Figure 6B:
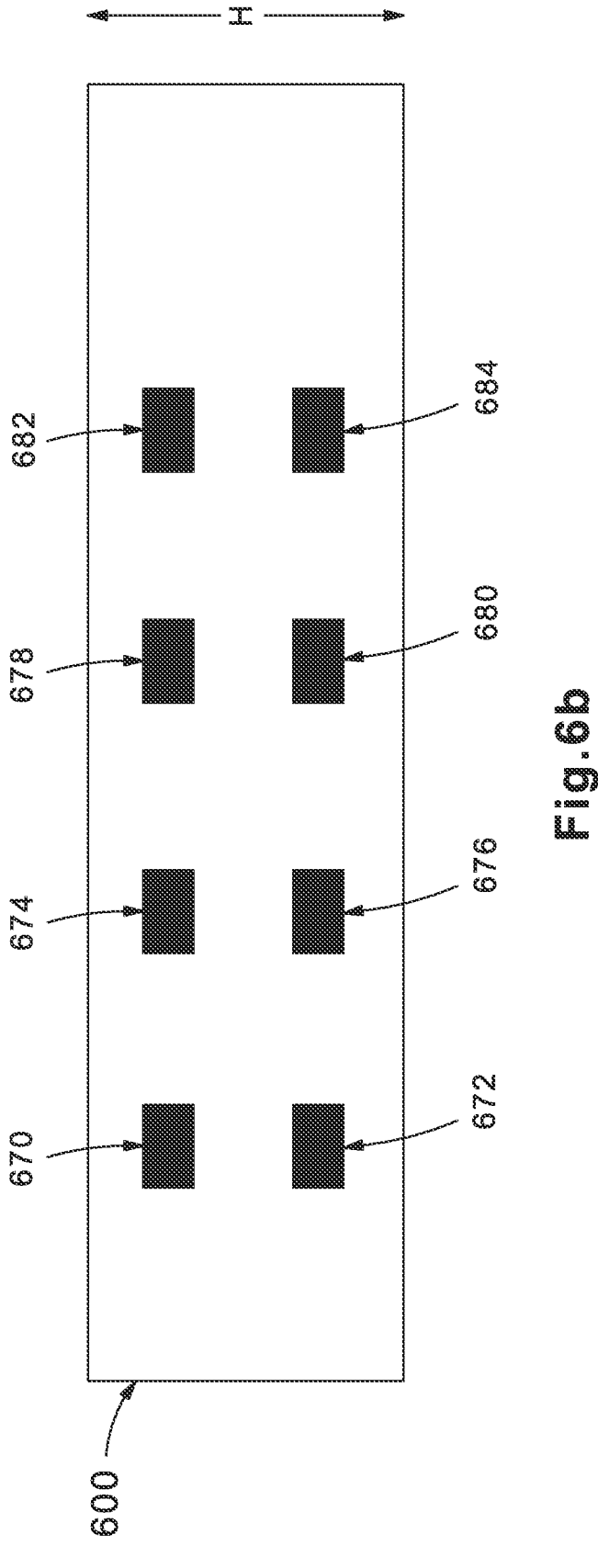
FIG. 6(b) shows a rear view of Module 600.

FIG. 6 shows a front and rear view of module 600, which requires transceivers SR8 or DR8 in the switches.

Each module 600 can be used to combine duplex fibers from up to 64 server ports. A stack of modules 600 is critical in facilitating the deployment of the mesh fabric at the server level. Module 600 has 64 duplex connectors and eight parallel-fiber connectors.

The duplex ports (601 to 664) in the front side of module 600 can be implemented using LC, SC, SN, MDC, or other duplex connectors. The parallel ports (670, 672, 674, 676, 678,680, 682, and 684) can be implemented using sets of four duplex connectors, e.g., four MDC or parallel connectors such as MPO16 or MMC, each comprising eight duplex channels. The duplex and parallel set of connectors can be placed on opposite sides, as shown in the figure, or on the same side of the module (not shown).

Ports 601 to 664 connect to servers in the equipment distribution area (EDA), whereas ports 670, 672, 674, 676, 678,680, 682, and 684, assumed MPO connectors with 16 fibers for illustration purposes, connect to optical cables from switches located in the horizontal distribution area (HDA) or main distribution area (MDA).

Figure 7:
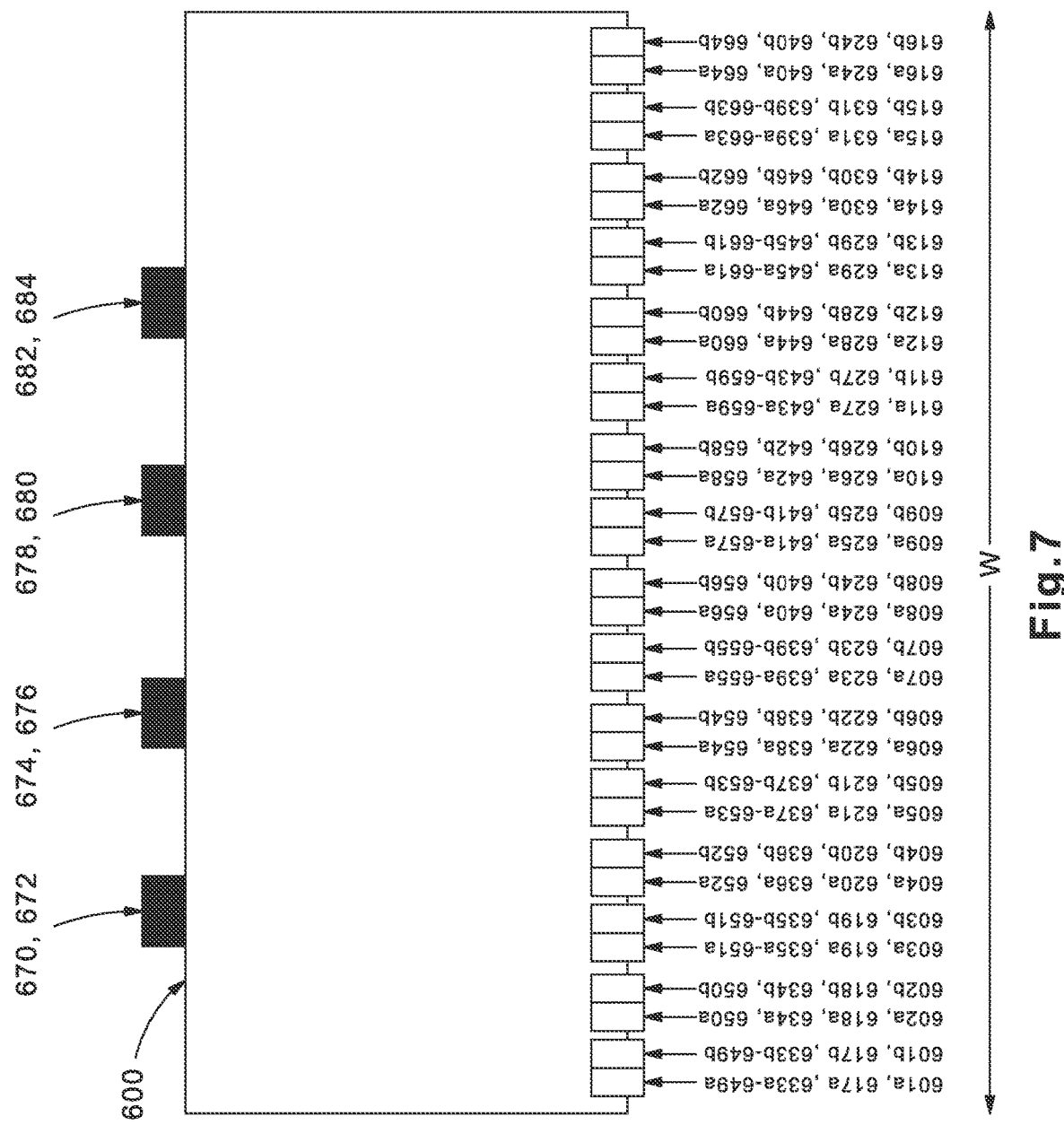
FIG. 7 shows a top view of Module 600.

FIG. 7 shows a top view of module 600, showing the duplex connections ports 601 to 664, where labels a and b are used to differentiate between a transmitting or receiving port. The width of module width, W, is in the range of 12 inches up to 19 inches, and the height, H, can be in the range of 1.4 to 2.2 inches.

Figure 8:
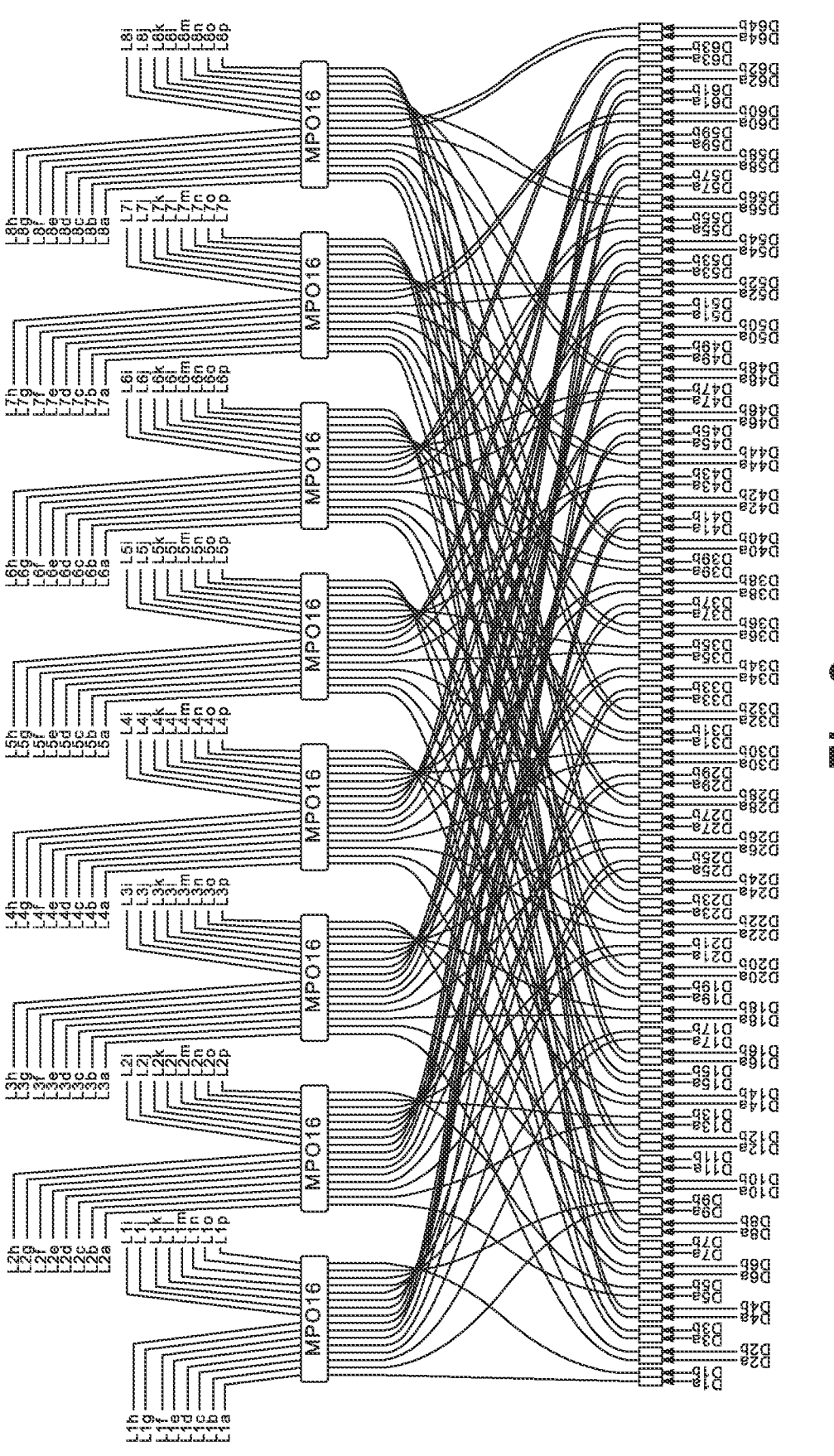
FIG. 8 shows a top view of Module 600 showing interconnection arrangements.

FIG. 8 shows the interconnection scheme of module 600 according to the present invention, using MPO16 as the parallel fiber connectors. The resultant interconnection map of module 600, comprising the fiber mesh, is shown in Table II. The arrows in the Table represent a referential light direction from transmitter to receivers.

The assignation from mesh interconnection shown in FIG. 8 and Table II to the physical ports of module 600 can have multiple configurations. Table III(a) and Table III(b) show two possible assignations of the duplex ports of the module to the and Table IV show port assignation for the duplex and parallel ports, respectively.

TABLE II

Interconnection table of module 600

| | | | | | | | |
|---|---|---|---|---|---|---|---|
| D1a -> L1a | D9a -> L1b | D17a -> L1c | D25a -> L1d | D33a -> L1e | D41a -> L1f | D49a -> L1g | D57a -> L1h |
| D1b <- L1p | D9b <- L1o | D17b <- L1n | D25b <- L1m | D33b <- L1l | D41b <- L1k | D49b <- L1j | D57b <- L1i |
| D2a -> L3a | D10a -> L3b | D18a -> L3c | D26a -> L3d | D34a -> L3e | D42a -> L3f | D50a -> L3g | D58a -> L3h |
| D2b <- L3p | D10b <- L3o | D18b <- L3n | D26b <- L3m | D34b <- L3l | D42b <- L3k | D50b <- L3j | D58b <- L3i |
| D3a -> L5a | D11a -> L5b | D19a -> L5c | D27a -> L5d | D35a -> L5e | D43a -> L5f | D51a -> L5g | D59a -> L5h |
| D3b <- L5p | D11b <- L5o | D19b <- L5n | D27b <- L5m | D35b <- L5l | D43b <- L5k | D51b <- L5j | D59b <- L5i |
| D4a -> L7a | D12a -> L7b | D20a -> L7c | D28a -> L7d | D36a -> L7e | D44a -> L7f | D52a -> L7g | D60a -> L7h |
| D4b <- L7p | D12b <- L7o | D20b <- L7n | D28b <- L7m | D36b <- L7l | D44b <- L7k | D52b <- L7j | D60b <- L7i |
| D5a -> L2a | D13a -> L2b | D21a -> L2c | D29a -> L2d | D37a -> L2e | D45a -> L2f | D53a -> L2g | D61a -> L2h |
| D5b <- L2p | D13b <- L2o | D21b <- L2n | D29b <- L2m | D37b <- L2l | D45b <- L2k | D53b <- L2j | D61b <- L2i |
| D6a -> L4a | D14a -> L4b | D22a -> L4c | D30a -> L4d | D38a -> L4e | D46a -> L4f | D54a -> L4g | D62a -> L4h |
| D6b <- L4p | D14b <- L4o | D22b <- L4n | D30b <- L4m | D38b <- L4l | D46b <- L4k | D54b <- L4j | D62b <- L4i |
| D7a -> L6a | D15a -> L6b | D23a -> L6c | D31a -> L6d | D39a -> L6e | D47a -> L6f | D55a -> L6g | D63a -> L6h |
| D7b <- L6p | D15b <- L6o | D23b <- L6n | D31b <- L6n | D39b <- L6l | D47b <- L6k | D55b <- L6j | D63b <- L6i |
| D8a -> L8a | D16a -> L8b | D24a -> L8c | D32a -> L8d | D40a -> L8e | D48a -> L8f | D56a -> L8g | D64a -> L8h |
| D8b <- L8p | D16b <- L8o | D24b <- L8n | D32b <- L8m | D40b <- L8l | D48b <- L8k | D56b <- L8j | D64b <- L8i |

TABLE IIIa

Physical Interconnection table from duplex ports to mesh shown in FIG. 8 in a horizontal layout.

| | | | | | | | | | | | | | | | |
|---|---|---|---|---|---|---|---|---|---|---|---|---|---|---|---|
| 601a | D1a | 609a | D9a | 617a | D17a | 625a | D25a | 633a | D33a | 641a | D41a | 649a | D49a | 657a | D57a |
| 601b | D1b | 609b | D9b | 617b | D17b | 625b | D25b | 633b | D33b | 641b | D41b | 649b | D49b | 657b | D57b |
| 602a | D2a | 610a | D10a | 618a | D18a | 626a | D26a | 634a | D34a | 642a | D42a | 650a | D50a | 658a | D58a |
| 602b | D2b | 610b | D10b | 618b | D18b | 626b | D26b | 634b | D34b | 642b | D42b | 650b | D50b | 658b | D58b |
| 603a | D3a | 611a | D11a | 619a | D19a | 627a | D27a | 635a | D35a | 643a | D43a | 651a | D51a | 659a | D59a |
| 603b | D3b | 611b | D11b | 619b | D19b | 627b | D27b | 635b | D35b | 643b | D43b | 651b | D51b | 659b | D59b |
| 604a | D4a | 612a | D12a | 620a | D20a | 628a | D28a | 636a | D36a | 644a | D44a | 652a | D52a | 660a | D60a |
| 604b | D4b | 612b | D12b | 620b | D20b | 628b | D28b | 636b | D36b | 644b | D44b | 652b | D52b | 660b | D60b |
| 605a | D5a | 613a | D13a | 621a | D21a | 629a | D29a | 637a | D37a | 645a | D45a | 653a | D53a | 661a | D61a |
| 605b | D5b | 613b | D13b | 621b | D21b | 629b | D29b | 637b | D37b | 645b | D45b | 653b | D53b | 661b | D61b |
| 606a | D6a | 614a | D14a | 622a | D22a | 630a | D30a | 638a | D38a | 646a | D46a | 654a | D54a | 662a | D62a |
| 606b | D6b | 614b | D14b | 622b | D22b | 630b | D30b | 638b | D38b | 646b | D46b | 654b | D54b | 662b | D62b |
| 607a | D7a | 615a | D15a | 623a | D23a | 631a | D31a | 639a | D39a | 647a | D47a | 655a | D55a | 663a | D63a |
| 607b | D7b | 615b | D15b | 623b | D23b | 631b | D31b | 639b | D39b | 647b | D47b | 655b | D55b | 663b | D63b |
| 608a | D8a | 616a | D16a | 624a | D24a | 632a | D32a | 640a | D40a | 648a | D48a | 656a | D56a | 664a | D64a |
| 608b | D8b | 616b | D16b | 624b | D24b | 632b | D32b | 640b | D40b | 648b | D48b | 656b | D56b | 664b | D64b |

TABLE IIIb

Physical Interconnection table from duplex ports to mesh shown in FIG. 8 in a vertical layout.

| | | | | | | | | | | | | | | | |
|---|---|---|---|---|---|---|---|---|---|---|---|---|---|---|---|
| 601a | D1a | 603a | D9a | 605a | D17a | 607a | D25a | 609a | D33a | 611a | D41a | 613a | D49a | 615a | D57a |
| 601b | D1b | 603b | D9b | 605b | D17b | 607b | D25b | 609b | D33b | 611b | D41b | 613b | D49b | 615b | D57b |
| 617a | D2a | 619a | D10a | 621a | D18a | 623a | D26a | 625a | D34a | 627a | D42a | 629a | D50a | 631a | D58a |
| 617b | D2b | 619b | D10b | 621b | D18b | 623b | D26b | 625b | D34b | 627b | D42b | 629b | D50b | 631b | D58b |
| 633a | D3a | 635a | D11a | 637a | D19a | 639a | D27a | 641a | D35a | 643a | D43a | 645a | D51a | 647a | D59a |
| 633b | D3b | 635b | D11b | 637b | D19b | 639b | D27b | 641b | D35b | 643b | D43b | 645b | D51b | 647b | D59b |
| 649a | D4a | 651a | D12a | 653a | D20a | 655a | D28a | 657a | D36a | 659a | D44a | 661a | D52a | 663a | D60a |
| 650b | D4b | 652b | D12b | 654b | D20b | 656b | D28b | 658b | D36b | 660b | D44b | 662b | D52b | 664b | D60b |
| 602a | D5a | 604a | D13a | 606a | D21a | 608a | D29a | 610a | D37a | 612a | D45a | 614a | D53a | 616a | D61a |
| 602b | D5b | 604b | D13b | 606b | D21b | 608b | D29b | 610b | D37b | 612b | D45b | 614b | D53b | 616b | D61b |
| 618a | D6a | 620a | D14a | 622a | D22a | 624a | D30a | 626a | D38a | 628a | D46a | 630a | D54a | 632a | D62a |
| 618b | D6b | 620b | D14b | 622b | D22b | 624b | D30b | 626b | D38b | 628b | D46b | 630b | D54b | 632b | D62b |
| 634a | D7a | 636a | D15a | 638a | D23a | 640a | D31a | 642a | D39a | 644a | D47a | 646a | D55a | 648a | D63a |
| 634b | D7b | 636b | D15b | 638b | D23b | 640b | D31b | 642b | D39b | 644b | D47b | 646b | D55b | 648b | D63b |
| 650a | D8a | 652a | D16a | 654a | D24a | 656a | D32a | 658a | D40a | 660a | D48a | 662a | D56a | 664a | D64a |
| 651b | D8b | 653b | D16b | 655b | D24b | 657b | D32b | 659b | D40b | 661b | D48b | 663b | D56b | 665b | D64b |

TABLE IV

Physical Interconnection table showing parallel port, e.g., MPO16 to fiber label.

| | | | | | | | | | | | | | |
|---|---|---|---|---|---|---|---|---|---|---|---|---|---|
| 670 | L1a | 672 | L9a | 674 | L17a | 676 | L25a | 678 | L33a | 680 | L41a | 682 | L49a | 684 | L57a |
| | L1b | | L9b | | L17b | | L25b | | L33b | | L41b | | L49b | | L57b |

TABLE IV-continued

| Physical Interconnection table showing parallel port, e.g., MPO16 to fiber label. | | | | | | | |
|---|---|---|---|---|---|---|---|
| L2a | L10a | L18a | L26a | L34a | L42a | L50a | L58a |
| L2b | L10b | L18b | L26b | L34b | L42b | L50b | L58b |
| L3a | L11a | L19a | L27a | L35a | L43a | L51a | L59a |
| L3b | L11b | L19b | L27b | L35b | L43b | L51b | L59b |
| L4a | L12a | L20a | L28a | L36a | L44a | L52a | L60a |
| L4b | L12b | L20b | L28b | L36b | L44b | L52b | L60b |
| L5a | L13a | L21a | L29a | L37a | L45a | L53a | L61a |
| L5b | L13b | L21b | L29b | L37b | L45b | L53b | L61b |
| L6a | L14a | L22a | L30a | L38a | L46a | L54a | L62a |
| L6b | L14b | L22b | L30b | L38b | L46b | L54b | L62b |
| L7a | L15a | L23a | L31a | L39a | L47a | L55a | L63a |
| L7b | L15b | L23b | L31b | L39b | L47b | L55b | L63b |
| L8a | L16a | L24a | L32a | L40a | L48a | L56a | L64a |
| L8b | L16b | L24b | L32b | L40b | L48b | L56b | L64b |

The disclosed apparatus 400 and 600 can be used to bring the fabric mesh to the servers enabling more redundancy, lower latency, and power consumption. The apparatus disclosed in this application requires servers, TPUs, and GPUs, with multiple optical duplex ports. Alternatively, it can be implemented for servers, TPUs, or GPUs or other edge devices have parallel fiber optical ports, e.g., MPO, using other apparatuses disclosed in RS 25024, 25595, and 25602.

Figures 9A, 9B, 9C:
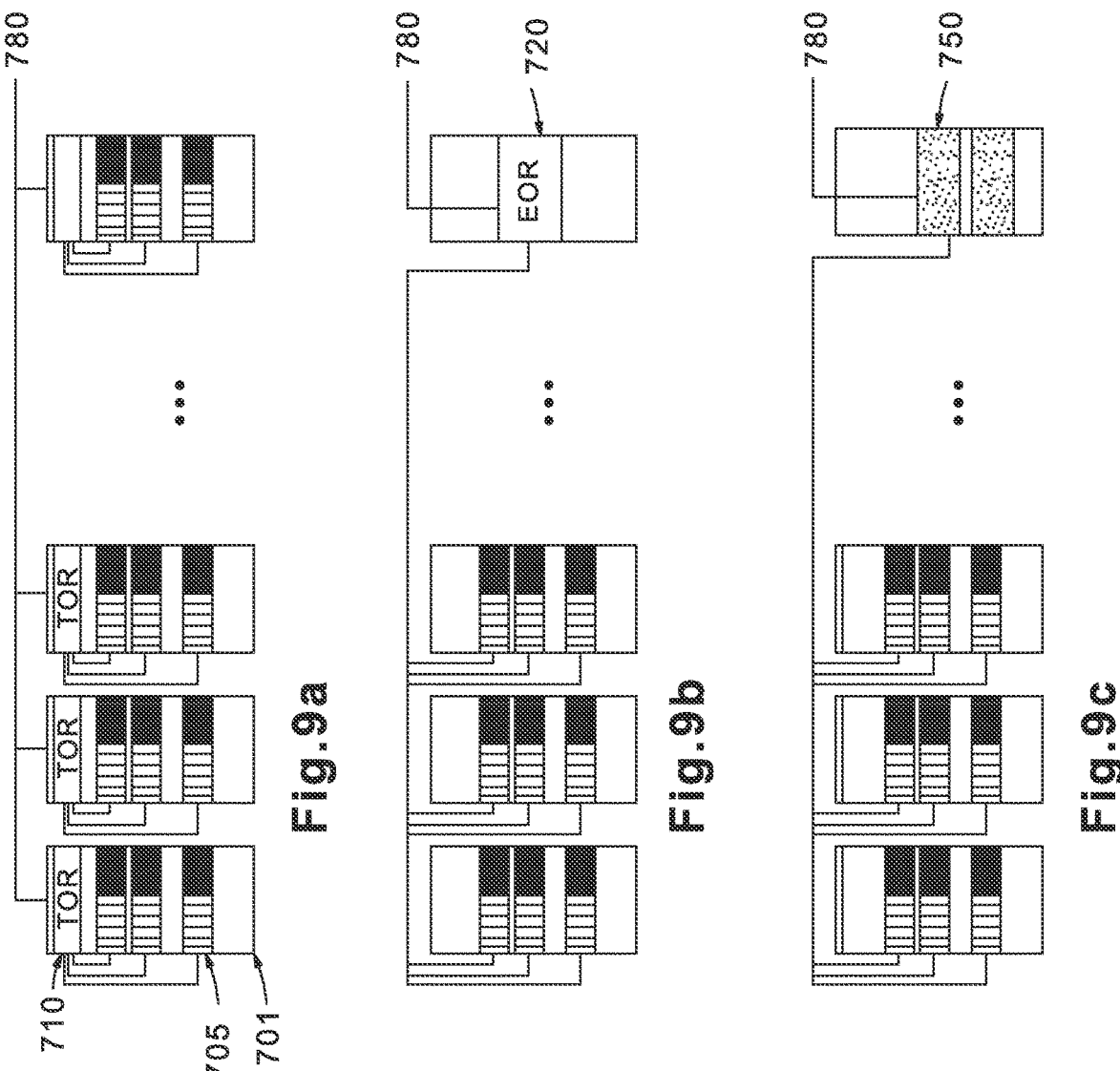
FIG. 9(a) illustrates a row with several server racks with TOR switches.
FIG. 9(b) illustrates a row with several server racks with EOR switches.
FIG. 9(c) illustrates a row with a stack of passive modules 400 or 600.

FIG. 9 shows a row of racks with servers 705. The figure illustrates the differences among networks using TOR, 710, as shown in part (a), EOR, 720, part (b), and the passive modules 750, part (c) of the figure. The label 750 represents a stack of modules 400 or 600.

In all configurations, 780 represents the fiber optic cables that connect the racks from EDA to the switches in the MDA or HDA. An implementation example, for up to 64 servers is shown in the next section. Following simpler methods described in the example, the number of servers can be scaled to few tens of thousands depending on the oversubscription.

Implementation Example

Figure 10B:
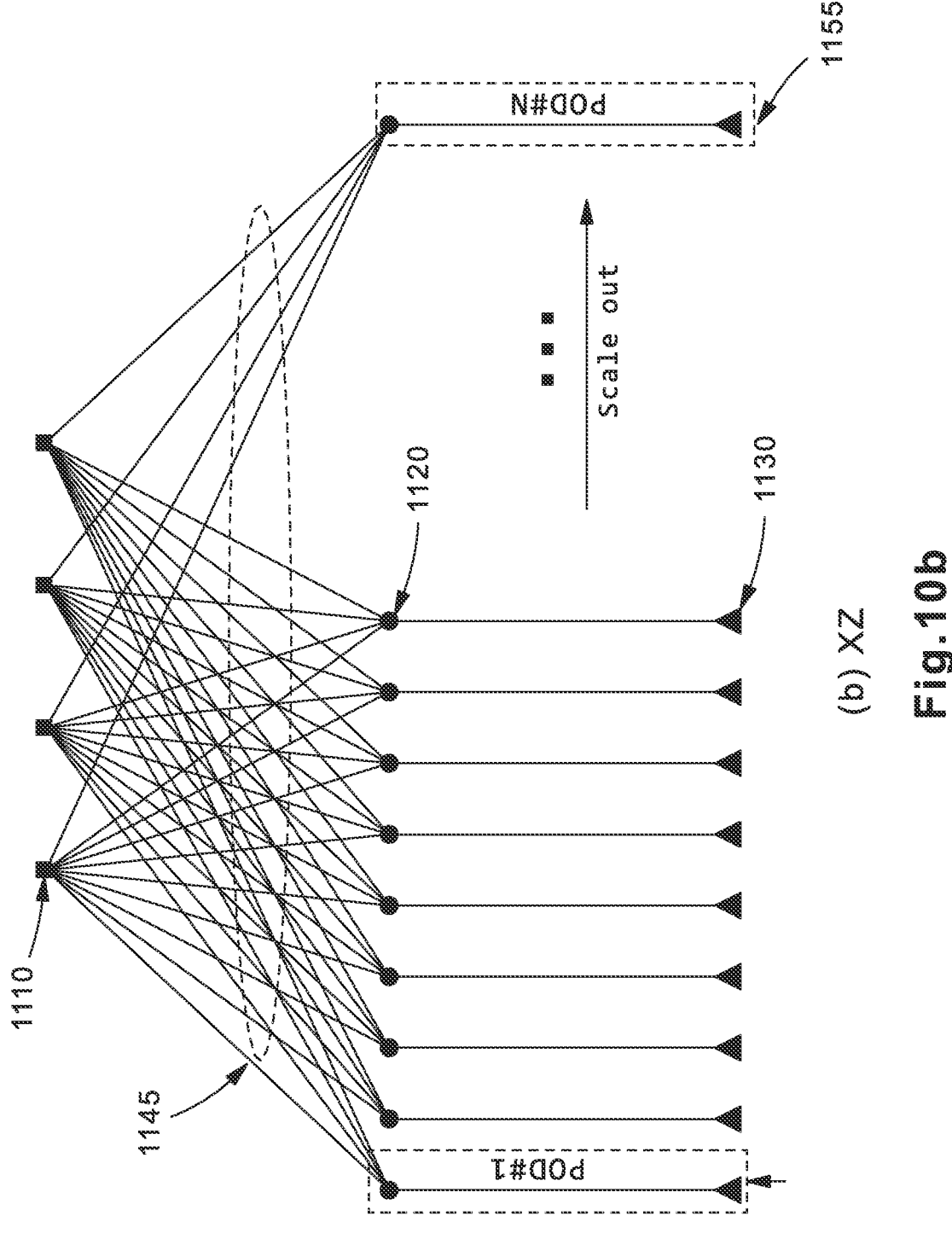
FIG. 10(b) shows a top view of the fabric showing the interconnections among Spines, 1110 and Leaf switches 1120.
Figure 10C:
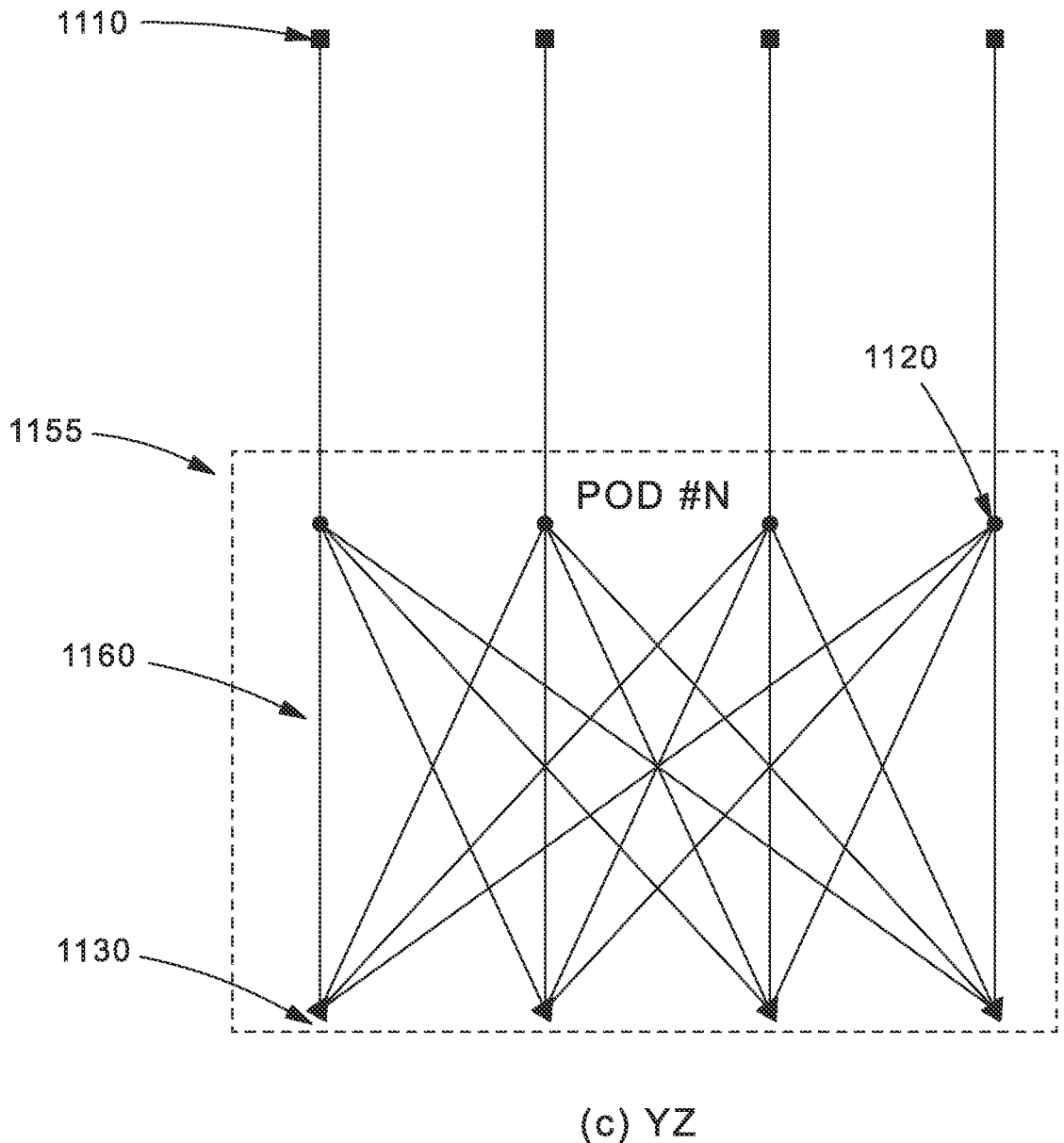
FIG. 10(c) shows a side view of the fabric shown the interconnections among Leaf switches, 1120 and servers 1130.

FIG. 10 shows a mesh fabric with two-layer of switches, sixteen Spines, 1110 represented as squares, and several hundreds of Leaf switches, 1120 represented as circles. The servers, 1130, represented by triangles, connect directly to the Leaf switches, as shown in the same figure. Part (a) of the figure shows a 3D view of some connections, where it can be seen that the network is composed of server mini PODs, such as 1150, the first mini POD, and 1155, the last mini POD. Each mini POD consists of four Leaf switches, 1120, and four servers, 1130 interconnected in a mesh fabric. This is different from than traditional interconnections method shown in FIGS. 9 (*a*) and (*b*), where the mesh occurs among switches.

The interconnection between Spine and Leaf switches occurs in four planes along the y-axis. In each one, a mesh fabric connects all the Spines and Leaf belonging to the plane. For example, 1140 represents the mesh of the first plane and 1145 the mesh of the last plane. A top view of the fabric that connects the Spine to Leaf switches, is shown in FIG. 10(*b*). In that figure, it can be seen that in each plane, the Spines 1110 connects to all mini PODs, denoted as POD #, 1150 1 to POD #N, 1155, through the Leaf 1120. A detailed view of the mini POD fabric mesh, e.g., POD #N, is shown in part (c) of the same figure. In that figure, 1160 represents duplex connections among Leaf switches, 1120, and servers, 1130.

The network can be scaled out by adding more mini PODs in the x directions (FIG. 10 *a*). The maximum number of mini PODs depends on the maximum number of ports of the Spine switches and the oversubscription required.

Assuming that the spines are implemented in chassis with 16 linecards and 32 parallel ports (MPOs) per linecard, up to 512 Leaf switches per plane can be deployed in this network. Assuming an oversubscription of 3:1, up to 6411 servers, each with four duplex uplinks, can be deployed using the described scaling out method. The Spines and Leaf can be implemented using chassis switches. In that case, it is recommended to keep each plane separated in a different linecard or switch to improve the redundancy of the network.

As shown in FIG. 10, the network has improved resilience since all servers have multiple redundant paths. This is different than the traditional networks shown in FIG. 9, where one TOR failure can disconnect a complete rack from the network, or the failure of an EOR switch can disconnect the complete row.

An example of how to use modules 400 or 600 to implement the server mesh for up to 64 servers is shown below. The connections between the Spine and Leaf can be implemented using apparatus and methods described in RSs 25024, 25595, and 25602.

Figure 11:
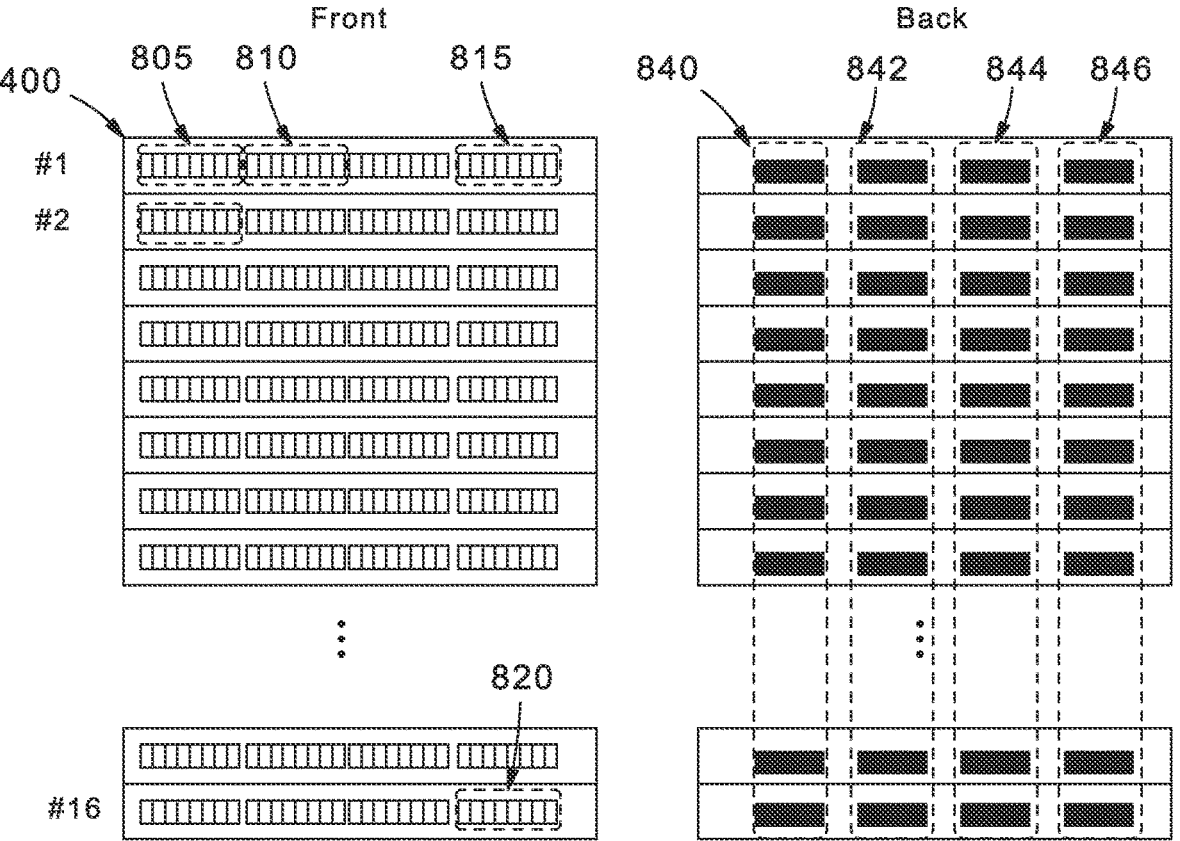
FIG. 11 shows an implementation using stack of modules 400.
Figure 12:
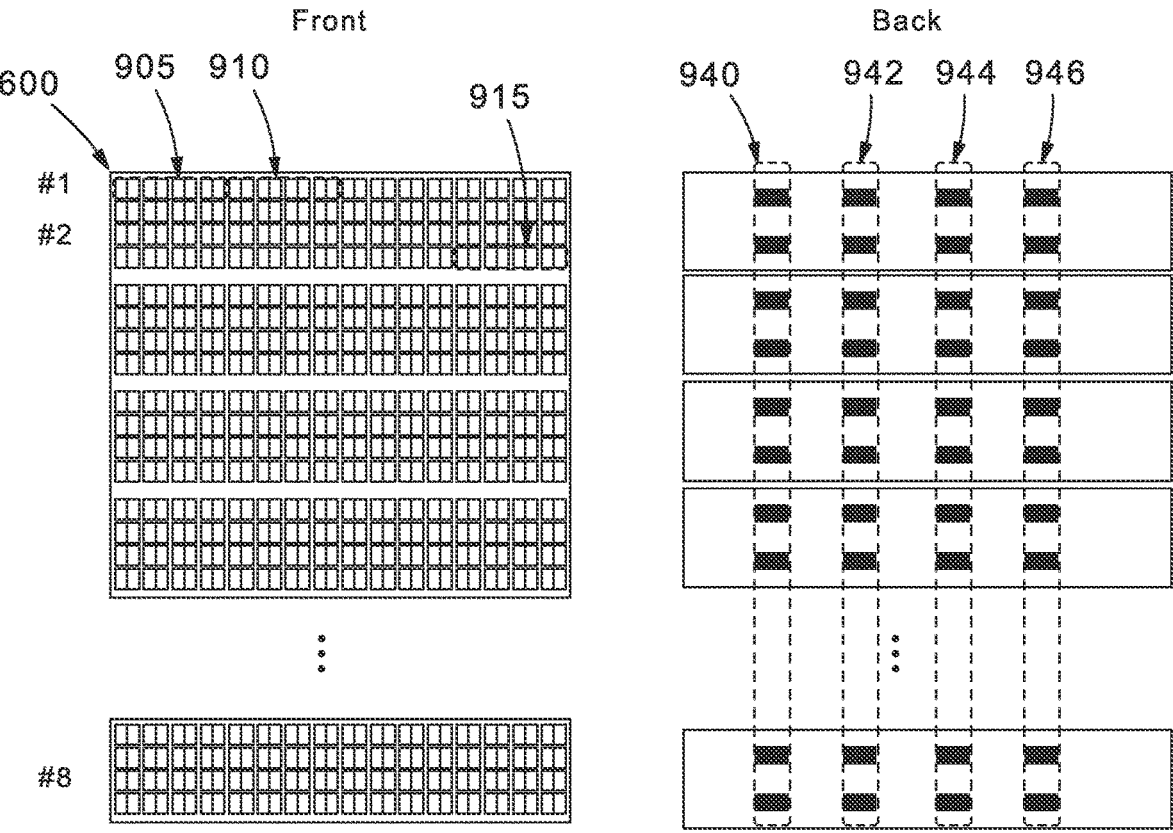
FIG. 12 shows an implementation using stack of modules 900.

FIG. 11 shows that a stack of 16 modules 400 can be used to connect 64 servers (with four uplinks) to the Leaf switches using mesh fabric. The Leaf switches have MPO ports with eight fibers used to transmit and receive signals. The transceivers used in the Leaf (and Spine) switches for this fabric are Y-BASE-SR4 or Y-BASE-DR4 or equivalent, where Y is the data rate. The front side shows the duplex connections, where 805 represents the four uplinks of the first server, 810 the four duplex uplinks of the second server, and 815 the last four duplex ports of modules 400 connect to the uplinks of the fourth server. The last ports of the last modules 400, connect to the uplinks of the 64$^{th}$ server. From the backside, the Leaf ports connect vertically. For example, assuming that sixteen Leafs are physically grouped in four switches, all 840 ports will connect to the first switch, all 842 ports to the second switch, and 846 to the last switch. Using chassis switches for the Spine and Leafs, the network can be scaled to ten thousand servers.

A similar fabric implemented with Leaf (and Spine) switches populated with Y-BASE-SR8 or Y-BASE-DR8 transceivers can be implemented using eight modules 600. The front side of module 600 shows the duplex connections, where 905 represents the four uplinks of the first server, 910 the four duplex uplinks of the second server, and 915 the last four duplex ports of modules 600 connect to the uplinks of the fourth server. The last ports of the last modules 600, connect to the uplinks of the $64^{th}$ server. From the backside, the Leaf ports connect vertically. For example, assuming that sixteen Leafs are physically grouped in four switches, all 940 ports will connect to the first switch, all 942 ports to the second switch, and 946 to the last switch. Using chassis switches for the Spine and Leafs, the network can be scaled to ten thousand servers.

The interconnection inside modules 400 can transmit signal at any wavelength from 830 nm-1650 nm. Moreover, the signals assigned to each wavelength can propagate in one direction, e.g., from a transmitter to receiver or in a bidirectional way, e.g., using bidirectional transceivers.

An important metric to characterize the degree of complexity reduction in the modules is the aggregated data rates per module are estimated using, $Da=f \times Nf \times Nc \times D$, where Nf is the number of fibers used per connector, e.g., Nf=16, Nc, the number of adapters in module 400, e.g., Nc=32, D is the data rate per fiber in one direction, and the f account for the bidirectional communication if bidirectional transceivers are used. For example, using the typical case shown in this document, Nf=16, Nc=32, f=1, Da=512 D. For current transceivers operating at D D=100 Gbps/lambda, Da=51.2 Tbps. Assuming next-generation transceivers operating at D=200 Gbps/lambda, Da=102.4 Tbps. Using VSFF connectors such as SN-MT or MMC, 3 NIMs can fit in 1RU, enabling mesh data rate densities of 307.2 Tbps per RU of mesh connectivity between switches. One rack (assume 50 Rus) full of modules 400 can potentially provide up to 15 Pbps of mesh connectivity.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An system having a plurality of apparatuses having a plurality of optical duplex and parallel connector adapters, where some a first portion of the adapters connect to network equipment in a network and others a second portion of the adapters connect to servers or processing units, where the apparatuses incorporate internal mesh, wherein a light path of each transmitter and receivers is matched in order to provide proper optical connections from transmitting to receiving fibers, wherein complex arbitrary network topologies can be implemented with at least 1/N less point to points interconnections, where N=a number of channels per connector adapters.

2. Apparatuses, according to claim 1 that can be stacked to provide Clos network topology of various radixes.

3. Apparatuses, according to claim 1 that can enable networks with different levels of oversubscription from 1:1 to 1:12.

4. Apparatuses, according to claim 1 that can be used to scale optical networks from tens to a couple of ten thousand servers.

5. Apparatuses, according to claim 1 that provides redundant paths, reducing the risk of network failure due to interconnection errors.

6. Apparatuses, according to claim 1 that have a small form factor that enables to stack of three modules in one RU, allowing the stacking of up to 132 modules per rack.

7. Apparatus, according to claim 1, where external labels can provide interconnection maps of the network to portable devices when the labels are read by said label readers such as laser scanning or cameras.

8. Apparatus, according to claim 1 that distributes the traffic load of the switches efficiently.

9. Apparatus, according to claim 1 that improve redundancy and reliability of server connections.

* * * * *